Figure 1:
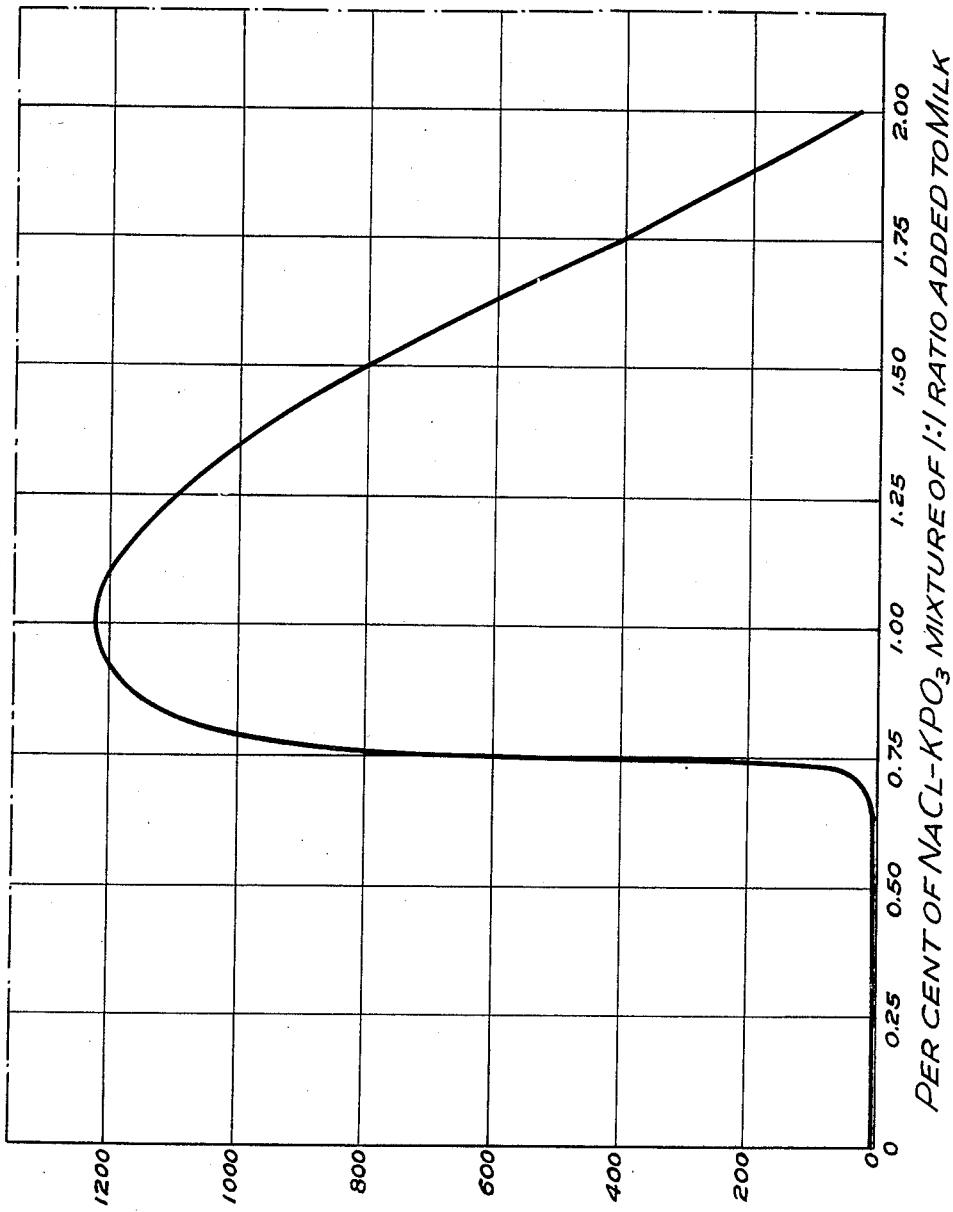

Jan. 15, 1952     E. P. PARTRIDGE     2,582,353
MILK PROTEIN PRODUCTS AND PROCESS

Filed Jan. 18, 1946     3 Sheets-Sheet 1

INVENTOR
Everett P. Partridge
BY
Stebbins, Blenko & Webb
ATTORNEYS

INVENTOR
Everett P. Partridge
BY
Stebbins, Blenko & Webb
ATTORNEYS

Jan. 15, 1952     E. P. PARTRIDGE     2,582,353
MILK PROTEIN PRODUCTS AND PROCESS
Filed Jan. 18, 1946     3 Sheets-Sheet 3
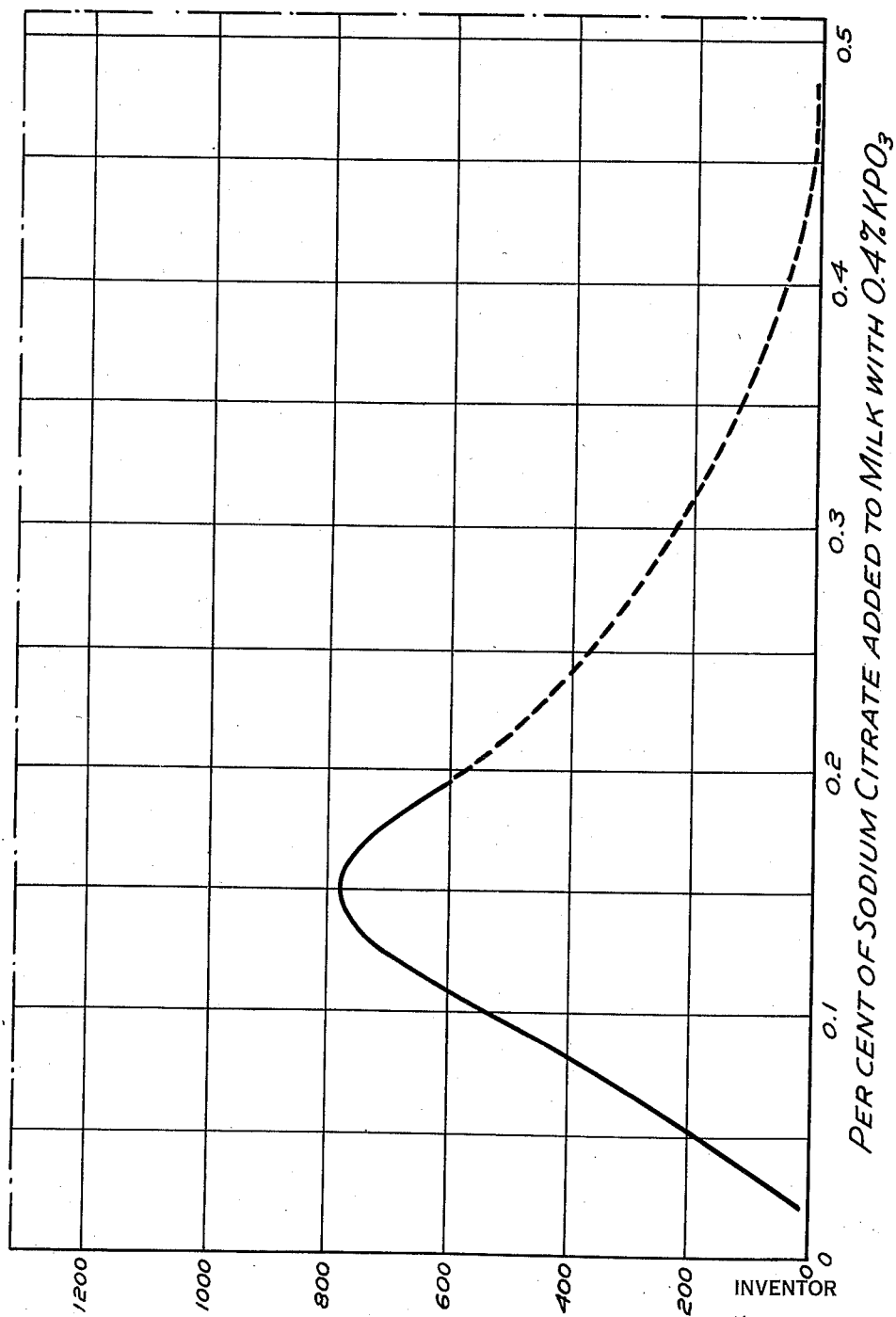

Patented Jan. 15, 1952

2,582,353

UNITED STATES PATENT OFFICE 2,582,353

MILK PROTEIN PRODUCTS AND PROCESS

Everett P. Partridge, Beaver, Pa., assignor to Hall Laboratories, Inc., Pittsburgh, Pa., a corporation of Pennsylvania Application January 18, 1946, Serial No. 642,019

15 Claims. (Cl. 99—54)

This invention relates to milk protein products and processes for making the same.

This invention is based on the discovery that water-insoluble crystalline potassium metaphosphate, when solubilized as hereinafter described, will react with milk protein to form a reaction product or products which have enormously increased viscosity as compared with the untreated protein solution and greatly increased water-binding capacity as compared with the untreated protein. These properties of the product resulting from the reaction between milk protein and solubilized water-insoluble crystalline potassium metaphosphate enable me to utilize the reaction product or the mixture of milk protein and solubilized water-insoluble crystalline potassium metaphosphate in many processes and products.

The reaction product obtained by reacting milk protein and solubilized water-insoluble crystalline potassium metaphosphate is distinctly different from the products obtained by treating milk protein with the alkali-metal phosphate glasses. The alkali-metal phosphate glasses having the overall composition of metaphosphate are readily water soluble. Potassium phosphate glass having the overall composition of metaphosphate does not affect the viscosity of milk proteins nor increase their water binding capacity. Sodium phosphate glass having the overall composition of metaphosphate actually decreases the viscosity of milk protein dispersions.

Water-insoluble crystalline potassium metaphosphate may be prepared by heating $KH_2PO_4$ to any temperature above about 300° C. and up to or above its melting point, which is about 810° C., and cooling either rapidly or slowly. The time of heating will vary according to the temperature employed. It should be long enough, however, that substantially all of the $KH_2PO_4$ is converted to $KPO_3$ since the presence of only a few per cent of unconverted water-soluble potassium salt will adversely affect its use in my process. If the material is heated to a melt, it should not be cooled with such extreme rapidity as to form a glass because the glassy product is readily water soluble and does not have the property of increasing the viscosity of milk protein solutions or of improving the water-binding properties of milk proteins. Accordingly, in order to produce the crystalline potassium metaphosphate, the melt should be cooled sufficiently slowly so as to produce a crystalline product or the temperature employed should not be sufficiently high to form a melt.

It has been found that there is a marked difference in the effect on milk proteins of $KPO_3$ prepared at different temperatures. This is shown by the following tests: Samples of crystalline $KPO_3$ were prepared by dehydrating $KH_2PO_4$ overnight (about 16 hours) at 400° C., 500° C., 600° C., 700° C., 800° C. and 900° C. Milk was first heated to the pasteurizing temperature of 150° F. Sodium chloride was then added to the hot milk and dissolved and followed immediately by the addition of crystalline $KPO_3$. The sodium chloride and crystalline $KPO_3$ were used in equal amounts by weight. The treated milk was held at the pasteurizing temperature for about thirty minutes, then cooled and tested for viscosity.

While the viscosities produced by samples of $KPO_3$ prepared at temperatures of 400° C., 500° C. and 900° C. fell in the range from 750 to 1000 centipoises when the optimum amounts were used, viscosities up to 1400, 2800, and 3100 centipoises, respectively, were attained with the samples prepared at 600° C., 800° C. and 700° C. Apparently it is desirable to stay below the fusion temperature of $KPO_3$, which is about 810° C. While there is a fairly large increase in viscosity on raising the temperature of preparation from 500 to 600° C., really phenomenal viscosities are obtained with the samples prepared at 700° C. and 800° C. It is therefore preferred to prepare the crystalline $KPO_3$ at a temperature between about 600° C. and a temperature which is just below the melting point of $KPO_3$. It is even more advantageous to prepare the crystalline $KPO_3$ by heating at a temperature between about 700° C. and a temperature which is just below the melting point of $KPO_3$.

In general the amounts of the mixture of sodium chloride and $KPO_3$ in 1:1 weight ratio required to produce the highest viscosity ranged from 1 to 1.75% on the weight of the milk.

Crystalline potassium metaphosphate is substantially insoluble in pure water, dissolving to the extent of about 40 parts per million and is, therefore, generally referred to as being water-insoluble.

Water-insoluble crystalline potassium metaphosphate has been described by R. Maddrell in Philosophical Magazine, Series 3, vol. 30 (1847), page 329, and has been called a salt of monometaphosphoric acid or a monometaphosphate by T. Fleitmann in Poggendorf's Annalen, vol. 78 (1849), pages 360–363.

Commercially the water-insoluble crystalline potassium metaphosphate may be made from phosphoric acid and a suitable potassium compound such as an oxide, hydroxide, carbonate, or chloride, sufficient heat being applied to drive off substantially all the water, and, in the case of potassium salts such as the carbonate or chloride, to drive off also the acidic constituents such as carbon dioxide and hydrogen chloride.

While crystalline potassium metaphosphate is substantially insoluble in distilled water, it can be solubilized by any water-soluble sodium salt or by any water-soluble alkali-metal salt other than potassium salts. Among the solubilizing agents which may also be employed for the potassium metaphosphate, I mention as examples the water-soluble salts of ammonium, calcium, barium and magnesium. Barium salts should not be employed in products to be used for food, but may be employed, if desired, in other types of products.

The water-insoluble crystalline sodium metaphosphate commonly known as Maddrell salt also interacts with the water-insoluble crystalline potassium metaphosphate to produce mutual dissolution. The dissolving action is more rapid in warm or hot solutions than in cool solutions. While the water-insoluble crystalline sodium metaphosphate does not itself increase the viscosity of milk protein products appreciably, as does the water-insoluble crystalline potassium metaphosphate, it may nevertheless be used with the latter as a solubilizing agent.

As above stated, when the crystalline potassium metaphosphate is solubilized, it will react with milk protein to produce a reaction product or products characterized by very high viscosity and water-binding capacity in aqueous dispersion. It is known that when water-insoluble potassium metaphosphate is dissolved by the action of a sodium salt, the simple aqueous solutions show an increase in viscosity. However, the viscosity produced by the reaction of the solubilized potassium metaphosphate with milk protein is of a totally different and higher order of magnitude than that which would be anticipated from simply mixing the somewhat viscous solution of potassium metaphosphate and a sodium salt with milk protein if no interaction occurred.

While in many cases it is advisable to solubilize the crystalline potassium metaphosphate by the use of an added solubilizing agent, in some cases the milk protein-containing solution which is to be treated with the crystalline potassium metaphosphate has sufficient solubilizing agent in it to cause the metaphosphate to dissolve, in which case it is not necessary to add a separate solubilizing agent.

The properties of greatly increased viscosity and water-binding capacity obtained by reaction of milk protein and water-insoluble crystalline potassium metaphosphate may be utilized in a wide variety of products and processes. Water-insoluble crystalline potassium metaphosphate may be used to improve milk products in general, specific examples of milk products being chocolate milk preparations in liquid, powdered or syrup form; market cream; ice cream and sherbet mixes; milk custards and puddings; milk solids confections as, for example, caramels; baked goods; and various forms of skim or whole milk as, for instance, condensed or evaporated milk. The water-insoluble potassium metaphosphate is compatible with materials hitherto employed as stabilizers for increasing the viscosity of food products, such as alginates, pectins, starches and gums, so that where desired these organic materials may be used in the same compositions with the metaphosphate.

In addition to its use in food products, the invention also is useful in the preparation of technical milk protein products. The principal milk protein of commerce is casein. The various products are commonly referred to as casein products, as for example, casein paints, casein plastics, casein adhesives, casein synthetic textiles, for instance, casein wool. The employment of solubilized crystalline potassium metaphosphate is useful in these or other products or processes involving casein or other milk proteins.

Chocolate milk preparations

In the preparation of chocolate milk liquid preparations or powders or syrups, various stabilizers have been employed for keeping the cocoa particles in suspension, among which may be mentioned starches, alginates and gums. I have found that solubilized crystalline potassium metaphosphate is an effective stabilizer for chocolate milk preparations. The crystalline potassium metaphosphate may be powdered and added directly to the chocolate milk, in which case the presence of sodium, calcium and other ions is depended upon for solubilizing the metaphosphate. A better method, however, is to predissolve the crystalline potassium metaphosphate in an aqueous solution containing a solubilizing agent and to add the solution to the milk and other ingredients of the chocolate milk preparation. The amount of water-insoluble crystalline potassium metaphosphate which should be added to the milk when the metaphosphate is added directly to the milk in powdered form or is predissolved and then added to the milk will vary somewhat depending upon the composition of the chocolate milk, but generally is between about 0.2% and 0.5% based on the weight of the milk. The metaphosphate is preferably added to the milk prior to or during the pasteurizing stage. The pasteurizing is carried out in the usual manner, the temperature generally being between 140 and 165° F. and the holding period being anywhere from 15 seconds to 30 minutes. Thereafter, the product is cooled.

Aside from its primary effect in producing unusual viscosity, one of the outstanding advantages of the water-insoluble potassium metaphosphate is the fact that it is not hygroscopic, as contrasted with the sodium phosphate glasses, which are strongly hygroscopic. The insoluble potassium metaphosphate can accordingly be mixed and packaged with other materials under conditions which would lead to undesirable caking or stickiness if the glassy phosphate were used. For example, mixtures comprising crystalline insoluble potassium metaphosphate and solubilizing agent for the potassium metaphosphate may be advantageously packaged, stored and then used as required.

The accompanying drawings illustrate the effect on viscosity of the addition to skim milk of mixtures of water-insoluble crystalline potassium metaphosphate and sodium chloride, and mixtures of water-insoluble crystalline potassium metaphosphate and sodium citrate.

Referring to Figure 1, there is shown the change in viscosity produced in milk by adding thereto a mixture of water-insoluble crystalline potassium metaphosphate and sodium chloride, the mixture consisting of equal parts by weight of the metaphosphate and sodium chloride. In carrying out the tests, the milk was first heated to the pasteurizing temperature of 150° F. The sodium chloride was then added to the hot milk and dissolved, and followed immediately by the addition of the potassium metaphosphate. The treated milk was held at the pasteurizing temperature for about 30 minutes. It was then cooled, held cold overnight, and tested for viscosity the following day. In Figure 1 the ordinate shows the viscosity and the abscissa shows the percentages by weight of the mixture based on the weight of the milk.

The curve of Figure 1 shows that with an amount of the mixture beginning at about 0.60% the viscosity increased very rapidly up to about 1.0% after which it began to decrease. The preferred amount of metaphosphate (when used with sodium chloride as the solubilizing agent) is accordingly between about 0.2 or 0.3% and 0.5%, although larger amounts of metaphosphate up to 0.75% or 0.90% still materially increase the viscosity of the milk.

Figure 2:
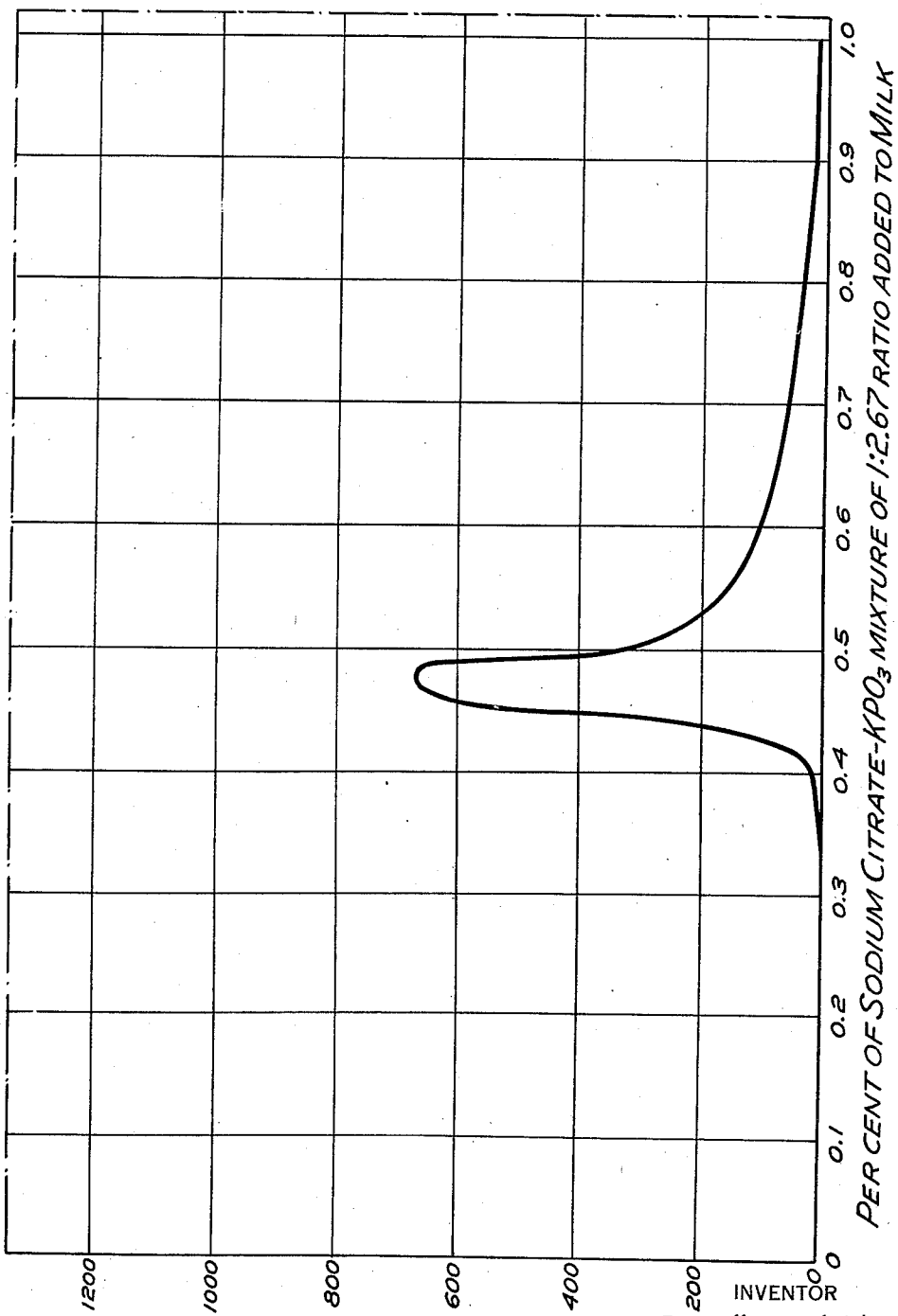

Referring to Figure 2, the materials added to the milk to change its viscosity were sodium citrate and water-insoluble crystalline potassium metaphosphate in the proportion by weight of one part of the citrate to 2.67 parts of the metaphosphate. A greatly increased viscosity is obtained when the amount of the mixture employed is between about 0.40% and 0.50%, after which the viscosity begins to decrease.

Figure 3 shows the viscosity effects obtained by adding a constant amount, i. e., 0.4% water-insoluble crystalline potassium metaphosphate, and varying amounts of sodium citrate. In this case the maximum viscosity was obtained employing about 0.15% of sodium citrate with the 0.4% potassium metaphosphate.

The amount of water-insoluble crystalline potassium metaphosphate which is added to the milk in any given instance will depend not only upon the particular composition of the milk but upon the increase in viscosity desired and upon the particular salt employed as the solubilizing agent.

*Improving the viscosity of market cream*

A simple process has long been sought for improving the viscosity of "light" or low-fat coffee or table cream. While it is possible to obtain the desired viscosity by homogenization under pressure, this generally causes a clumping of the fat globules and results in 'feathering" or coagulation when the cream is added to hot coffee.

According to the present invention, the viscosity of "light" or low-fat cream may be increased by adding to it water-insoluble crystalline potassium metaphosphate and a suitable solubilizing agent for the metaphosphate, as, for example, sodium citrate.

*Ice cream, sherbert or other confection mixes*

In the preparation of ice cream mixes, it is common to employ various stabilizers such as, for example, gelatins, alginates, starches and other stabilizers. Generally speaking, all of these materials have the property of increasing the viscosity of the mix and imparting certain desirable properties to the frozen confection. In accordance with the present invention, water-insoluble crystalline potassium metaphosphate may be used in place of or in conjunction with any of the other stabilizers.

In the formulation of milk custards and puddings, milk solids confections as, for example, caramels and in baked goods, milk solids are employed and in many cases thickening agents such as starch are also used. Such products may be improved according to my invention by the employment of water-insoluble crystalline potassium metaphosphate and a suitable solubilizing agent. A composition of matter which may be sold in commerce for making such products may comprise a dry mixture of soluble milk protein and water-insoluble crystalline potassium metaphosphate either with or without a solubilizing agent for the metaphosphate.

The following is an example of a method of preparing a chocolate pudding according to my invention. The following dry mixture is made:

| | Parts by weight |
|---|---|
| Sugar | 5.0 |
| Chocolate flavoring agent | 2.0 |
| Sodium citrate | 0.2 |
| Crystalline potassium metaphosphate | 0.8 |

The mixture is then added to 100 parts 2:1 condensed or evaporated milk which has been heated to about 150° F. If desired dried milk in the amount of 20 parts could be incorporated with the other dry ingredients and the mixture added to 100 parts water which has been heated to about 150° F. In either case the final preparation is kept hot for about 5 to 15 minutes or until the desired viscosity develops after which the preparation is cooled.

In the production of technical casein products such as paints, plastics, adhesives, sizes and synthetic textiles, I may employ water - insoluble crystalline potassium metaphosphate and where needed a solubilizing agent whenever it is desired to increase the viscosity and water-binding properties of the product.

Wherever I refer to solutions containing milk proteins, it is intended to include not only true solutions but dispersions and suspensions as well, and it is intended to include not only aqueous mixture of milk protein but to include milk and cream in the ordinary liquid state or preparations made by reconstitution of dried products. Thus where I refer to a process of increasing the viscosity of solutions containing milk proteins, the solution may be either a true solution or a dispersion and the solution may be a solution of previously prepared milk protein or might be milk, skim milk, cream, or mixtures thereof, plain, concentrated, or reconstituted from a dry state.

The invention is not limited to the preferred examples but may be otherwise embodied or practiced within the scope of the following claims.

I claim:

1. A composition of matter comprising milk protein and water-insoluble crystalline potassium metaphosphate, said crystalline potassium metaphosphate having been prepared by heating at a temperature between about 600° C. and a temperature just below its melting point.

2. A composition of matter comprising milk protein, water - insoluble crystalline potassium metaphosphate and a solubilizing agent for the metaphosphate, said crystalline potassium metaphosphate having been prepared by heating at a temperature between about 600° C. and a temperature just below its melting point.

3. A composition of matter comprising milk protein, water - insoluble crystalline potassium metaphosphate and a solubilizing agent for the metaphosphate, said crystalline potassium metaphosphate having been prepared by heating at a temperature between about 700° C. and a temperature just below its melting point.

4. As a new composition of matter, the reaction product of milk protein and water-insoluble crystalline potassium metaphosphate, said crystalline potassium metaphosphate having been prepared by heating at a temperature between 700° C. and a temperature just below its melting point.

5. The reaction product of milk protein, water-insoluble crystalline potassium metaphosphate and a water-soluble salt of the group consisting of ammonium salts, alkali-metal salts other than potassium salts, and barium, calcium and magnesium salts, said crystalline potassium metaphosphate having been prepared by heating at a temperature between about 700° C. and a temperature just below its melting point.

6. The process of increasing the viscosity of suspensions containing milk protein, which comprises mixing therewith in the presence of a solubilizing agent for the metaphosphate, water-insoluble crystalline potassum metaphosphate, said crystalline potassium metaphosphate having been prepared by heating at a temperature between about 700° C. and a temperature just below its melting point.

7. A thickening agent for milk protein products, comprising a dry mixture of soluble milk protein, water-insoluble crystalline potassium metaphosphate and as a solubilizing agent for the potassium metaphosphate, a water-soluble salt of the group consisting of ammonium salts, alkali-metal salts other than potassum salts, and barium, calcium and magnesium salts, said crystalline potassium metaphosphate having been prepared by heating at a temperature between about 700° C. and a temperature just below its melting point.

8. The process of treating a normally liquid suspension containing milk protein and an agent effective therein for solubilizing water-insoluble crystalline potassium metaphosphate, which comprises distributing water-insoluble crystalline potassium metaphosphate therethrough and thereby increasing its viscosity.

9. The process of treating a normally liquid suspension containing milk protein which comprises incorporating water-insoluble crystalline potassium metaphosphate therewith, also incorporating therewith a solubilizing agent for the metaphosphate, and distributing the metaphosphate and the solubilizing agent through the liquid suspension and thereby increasing its viscosity.

10. The process of treating a normally liquid suspension containing milk protein which comprises incorporating water-insoluble crystalline potassium metaphosphate therewith, also incorporating therewith a water-soluble salt of the group consisting of ammonium salts, alkali-metal salts other than potassium salts, and barium, calcium and magnesium salts, and distributing the metaphosphate and the water-soluble salt throughout the liquid suspension and thereby increasing its viscosity.

11. The process of treating a normally liquid suspension containing milk protein which comprises incorporating water-insoluble crystalline potassium metaphosphate therewith, also incorporating therewith an alkali-metal citrate other than potassium citrate and distributing the metaphosphate and the citrate throughout the liquid suspension and thereby increasing its viscosity.

12. A chocolate milk preparation consisting essentially of milk, cocoa and water-insoluble crystalline potassium metaphosphate, the cocoa being in suspension in the milk, the metaphosphate being present in an amount between about 0.2% and 0.5% based on the weight of the milk.

13. A chocolate milk preparation consisting essentially of milk, cocoa, water-insoluble crystalline potassium metaphosphate, and a solubilizing agent for the potassium metaphosphate, the cocoa being in suspension in the milk, the metaphosphate being present in the amount between about 0.2% and 0.5% based on the weight of the milk.

14. A composition useful in the making of stable milk protein products comprising a dry mixture of a water-dispersible milk protein and water-insoluble crystalline potassium metaphosphate.

15. A composition useful in the making of stable milk protein products comprising a dry mixture of a water-dispersible milk protein, water-insoluble crystalline potassium metaphosphate, and a solubilizing agent for the potassium metaphosphate.

EVERETT P. PARTRIDGE.

REFERENCES CITED

The following references are of record in the file of this patent:

UNITED STATES PATENTS

| Number | Name | Date |
|---|---|---|
| 1,897,892 | Draisbach | Feb. 14, 1933 |
| 2,064,387 | Schwartz | Dec. 15, 1936 |
| 2,097,229 | Lucas | Oct. 26, 1937 |
| 2,216,485 | Brandt | Oct. 1, 1940 |
| 2,238,906 | Martell et al. | Apr. 22, 1941 |
| 2,253,389 | Mnookin | Aug. 19, 1941 |
| 2,267,911 | Grettie et al. | Dec. 30, 1941 |
| 2,341,425 | Curry | Feb. 8, 1944 |
| 2,400,834 | Gloahec | May 21, 1946 |
| 2,405,276 | Taylor | Aug. 6, 1946 |
| 2,437,297 | Garrison | Mar. 9, 1948 |
| 2,445,893 | Tjoflat | July 27, 1948 |